(12) United States Patent
Shinkai et al.

(10) Patent No.: US 7,758,970 B2
(45) Date of Patent: Jul. 20, 2010

(54) DIFFERENT MATERIALS BONDED MEMBER AND PRODUCTION METHOD THEREOF

(75) Inventors: Masayuki Shinkai, Ama-Gun (JP); Takahiro Ishikawa, Toyoake (JP); Masahiro Kida, Ama-Gun (JP)

(73) Assignee: NGK Insulators, Ltd., Nagoya-Shi (JP)

( * ) Notice: Subject to any disclaimer, the term of this patent is extended or adjusted under 35 U.S.C. 154(b) by 0 days.

(21) Appl. No.: 12/104,547

(22) Filed: Apr. 17, 2008

(65) Prior Publication Data

US 2008/0230585 A1  Sep. 25, 2008

Related U.S. Application Data

(62) Division of application No. 10/732,964, filed on Dec. 11, 2003, now Pat. No. 7,398,912.

(30) Foreign Application Priority Data

Dec. 26, 2002 (JP) ............................. 2002-377160

(51) Int. Cl.
*B32B 15/04* (2006.01)
(52) U.S. Cl. ..................... 428/621; 228/122.1; 428/628
(58) Field of Classification Search ........................ None
See application file for complete search history.

(56) References Cited

U.S. PATENT DOCUMENTS

| | | | |
|---|---|---|---|
| 4,463,059 A * | 7/1984 | Bhattacharya et al. ...... 428/620 |
| 4,772,935 A | 9/1988 | Lawler et al. |
| 4,835,593 A | 5/1989 | Arnold et al. |
| 4,871,108 A | 10/1989 | Boecker et al. |
| 4,901,904 A | 2/1990 | Tsuno |
| 5,023,147 A * | 6/1991 | Nakata et al. ............... 428/627 |
| 5,113,052 A | 5/1992 | Gabriel |
| 5,367,195 A | 11/1994 | DiGiacomo et al. |
| 5,854,087 A | 12/1998 | Kurata |
| 6,145,731 A | 11/2000 | Tower et al. |
| 6,291,804 B1 * | 9/2001 | Fujii .......................... 219/541 |
| 6,315,188 B1 | 11/2001 | Cadden et al. |
| 6,635,358 B2 | 10/2003 | Shinkai |
| 6,881,499 B2 | 4/2005 | Shinkai et al. |
| 6,918,530 B2 | 7/2005 | Shinkai et al. |

(Continued)

FOREIGN PATENT DOCUMENTS

GB          979811    *  1/1965

(Continued)

*Primary Examiner*—Jennifer C McNeil
*Assistant Examiner*—Adam C Krupicka
(74) *Attorney, Agent, or Firm*—Burr & Brown (57) ABSTRACT

A different materials bonded member includes a ceramic base material and a metallic member which are bonded together through an Au solder material. The solder material is disposed on a bonding surface of the ceramic base through a given active metal layer or a given metalized layer and the solder material is heated and melted to form a pre-coat layer adhering to the bonding surface, the metallic member is disposed on a surface of the pre-coat layer through a barrier layer having a given function. A bonded part is formed by solidifying the pre-coat layer after it has been heated and melted under given temperature conditions to bond the ceramic base and the metallic member to one another.

14 Claims, 6 Drawing Sheets

U.S. PATENT DOCUMENTS

2002/0038813 A1    4/2002    Shinkai

FOREIGN PATENT DOCUMENTS

| JP | 64-042370 | A1 | 2/1989 |
| JP | 09-108886 | A1 | 4/1997 |
| JP | 10-209255 | A1 | 8/1998 |
| JP | 11-278951 | A1 | 10/1999 |
| JP | 2001-199775 | A1 | 7/2001 |
| JP | 2002-037679 | A1 | 2/2002 |

* cited by examiner

DIFFERENT MATERIALS BONDED MEMBER AND PRODUCTION METHOD THEREOF

CROSS REFERENCE TO RELATED APPLICATIONS

This application is a division of U.S. application Ser. No. 10/732,964, now allowed, having a filing date of Dec. 11, 2003, and claims the benefit under 35 USC §119(a)-(d) of Japanese Application No. 2002-377160 having a filing date of Dec. 26, 2002, the entireties of which are incorporated herein by reference.

FIELD OF THE INVENTION

The present invention relates to a bonded member comprising different types of materials and a production method thereof. More specifically, the present invention relates to a bonded member comprising different types of materials that is usable at high temperatures and a production method thereof.

BACKGROUND OF THE INVENTION

As a method of bonding different materials such as a ceramic base material (ceramic base) and a metallic member to each other, a method such as one using a solder material can be used. However, during a cooling process after high-temperature bonding, thermal stress caused by a difference in thermal expansion coefficient between the different materials or between the solder material used for bonding the different materials together and the materials occurs. This causes a separation at the interface between the materials or causes cracks in the vicinity of the interface if one of the materials is brittle, so that desired bonding strength and air tightness cannot be obtained in some cases. Since products (different materials bonded member) having the aforementioned troubles broken during a production process must be discarded as defective products, there is an unfavorable increase in production costs. Further, if the product is subjected to thermal cycles in use, for example cycling using a high-temperature heater and so on, these troubles occur after use causing a deterioration of reliability of the product.

As a method of bonding a ceramic base and a metallic member to each other by use of a solder material, there is available a method in which the bonding surface of the ceramic base is bonded to the metallic member after a metallization treatment with a vapor of Mn or Cr, etc. in order to ensure wettability. Another wettability improving method is available in which a reaction layer such as a nitride or an oxide, etc. is formed on the bonding surface of the ceramic base by adding Ti and so on into the soldering material instead of plating.

Meanwhile, in these methods, unless some measures are taken against thermal stress which occurs at the interface between the bonded materials so as to reduce the thermal stress, cracks are often formed in a base material, which is vulnerable to the thermal stress and separation occurs at the interface. That is, not only can bonding strength between the bonded materials be influenced, but also various other properties that are required from composite bonded members under use in specific fields, such as air tightness, may be influenced. Particularly, it is very difficult to bond a low-strength base material such as aluminum nitride and a member composed of metal or the like to each other while reducing the occurrence of the above problems.

To solve the above problems, there is available a method of bonding a ceramic base and a metallic member together through liquid-phase bonding using a solder material as a bonding material comprising a metal of low proof stress such as Au which undergoes plastic deformation by a low stress. However, in a case where a metallic member comprises Ni, Co or metal comprising any one thereof, for example Kovar, the metal itself, that is Ni, Co or its constituent, e.g. Fe, diffuses into Au constituting the solder material, thereby increasing the proof stress of Au. As a result, a thermal cycle or a thermal shock may crack the base material.

Moreover, when, for example, Kovar is used as the metallic member, in the case of bonding Kovar to the ceramic base, the components constituting the Kovar (Fe, Ni, Co) diffuse into the solder material to form an intermetallic compound layer of low electrical conductivity, which causes deterioration of thermal cycle characteristics and abnormal heat generation at that part.

On the other hand, use of a metal which does not form a solid solution with Au, such as W, Mo or the like, as the metallic member can also be considered. However, these metallic materials are severely oxidized under high temperature conditions in the air, and cannot be used as metallic members for high-temperature heaters which are exposed to such conditions.

Figure 4:
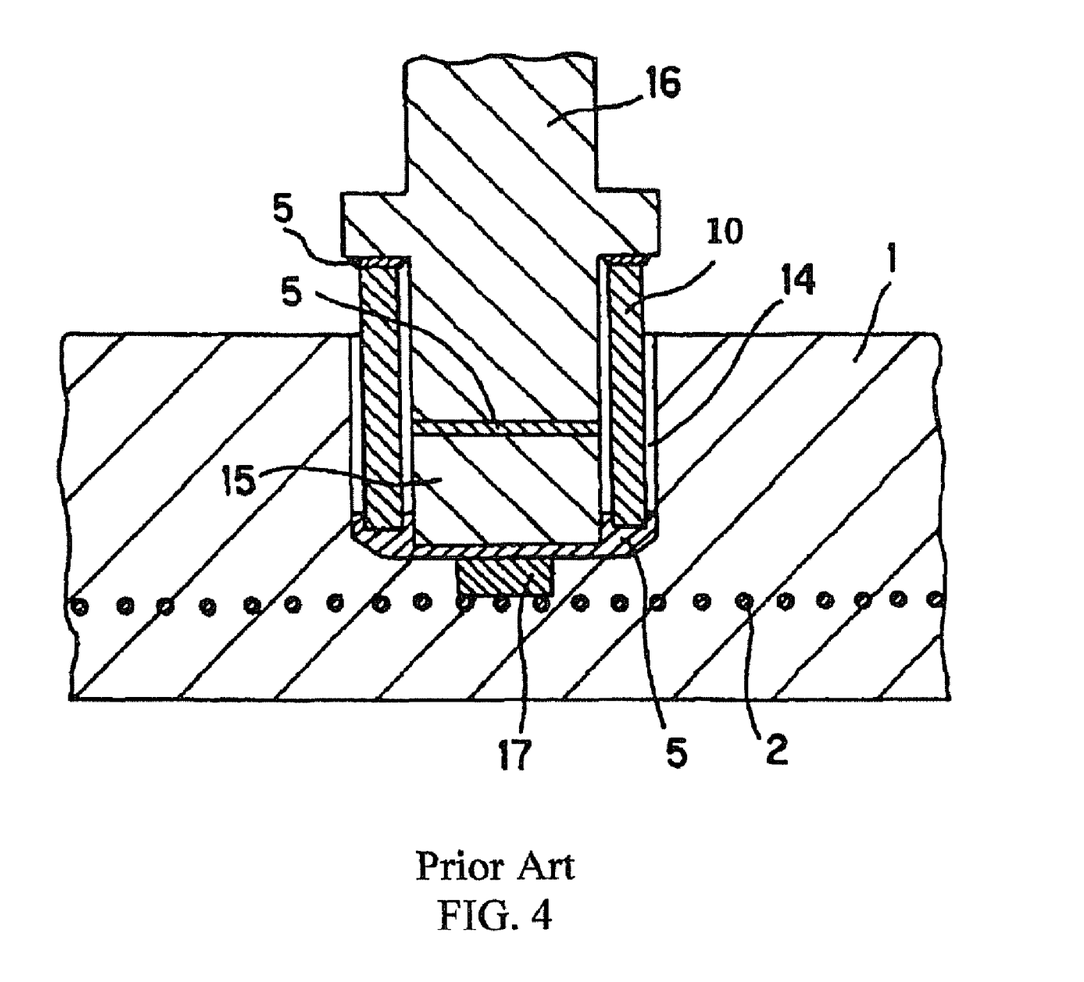
FIG. 4 is a cross-sectional diagram showing a bonding structure of a susceptor for disposing a semiconductor wafer according to the prior art.

For solving the above problems, it has been attempted to devise the bonding structure. For example, JP-A-10-209255 discloses a bonding structure of a ceramic base 1 and a connector for a power supply 16 as shown in FIG. 4 as a susceptor for disposing a semiconductor wafer. A hole 14 is provided in a ceramic base material 1. From the hole 14, a metallic member 17 comprising a metal such as Mo which has a thermal expansion coefficient approximate to that of the ceramic base material 1, is embedded with a portion thereof beforehand. Further, in the hole 14, a cylindrical atmosphere protector 10 is inserted, and inside the protector 10, a connector 16 for supplying power and a low thermal expansion material 15 are inserted. The protector 10 and the connector 16 are hermetically bonded together with a solder material 5, and the material 15 and the protector 10 are hermetically bonded to the metallic member 17 with the solder material 5.

According to this bonding structure shown in FIG. 4, residual stresses at the time of bonding material 15 and the metallic member 17 together are relaxed, and oxidation of the metallic member 17 is also restrained by the atmosphere protector 9. Hence, even if bonding is carried out by use of a solder material of high proof stress such as the Au-18Ni solder material, no cracks occur in the ceramic base material 1 at bonding. Moreover, since the strength change caused by heat is little as well, the endurance reliability when the bonded interfaces are exposed to a thermal cycle or a thermal shock. However, the foregoing bonding structure has such problems that the number of parts is large and that a very high production control ability is required, because deterioration of the metallic member 17 occurs due to its oxidation unless the atmosphere protector 10 and the metallic member 17 are fully bonded to each other.

Figure 5:
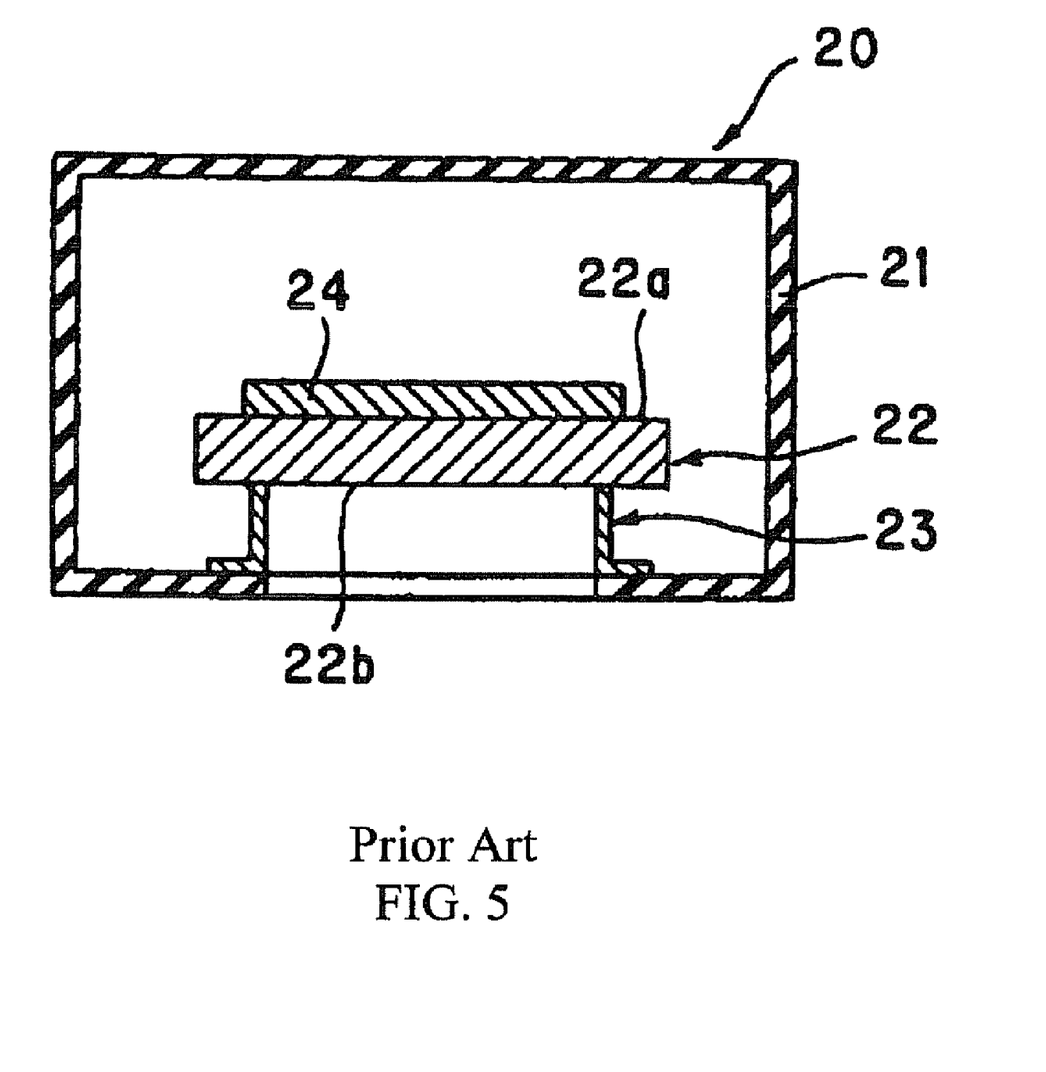
FIG. 5 is a cross-sectional diagram showing another bonding structure of the susceptor for disposing a semiconductor wafer according to the prior art.
Figure 6:
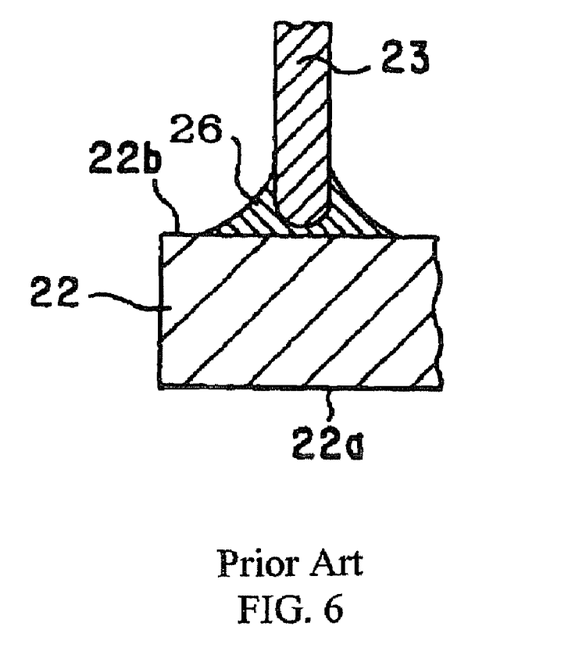
FIG. 6 is a local cross-sectional diagram showing a bonding form of a ring and a susceptor according to the prior art.
Figure 7:
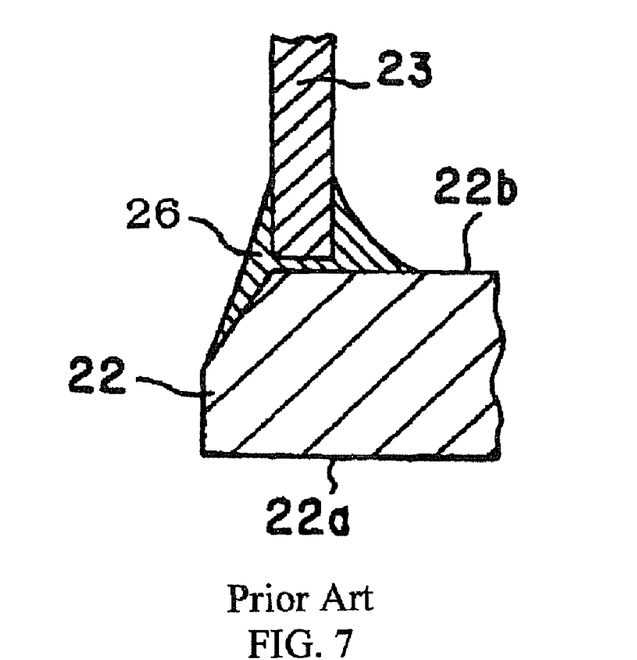
FIG. 7 is a local cross-sectional diagram showing another bonding form of the ring and the susceptor according to the prior art.

Further, JP-A-11-278951 discloses the structures of a corrosion-resistant metal ring 23 and a susceptor 22 such as one shown in FIG. 6 or 7 so as to relax thermal stress which occurs when a corrosion-resistant metal ring 23 made of Kovar or the like is bonded to the back side 22b of a ceramic susceptor 22 for disposing a semiconductor wafer 24 installed in the chamber 21 of a semiconductor container with the structure shown in FIG. 5. Namely, employing such structure of members (corrosion-resistant metal ring 23 and susceptor 22) is effective for relaxation of thermal stress. However, bonding a ceramic base 1 and a corrosion-resistant metal ring 23 with a melted solder material 26 causes the metal component constituting the corrosion-resistant metal ring 23 to be eluted into the solder material 26 and the solder material 26 tends to be deteriorated. Nothing but the consideration about the shape of the members shown in FIGS. 6 and 7 bring insufficient effect for relaxation of thermal stress, and a defect such as a breakage of ceramic base 1 may occur.

SUMMARY OF THE INVENTION

The present invention has been conceived in view of such problems of the prior art. An object of the present invention is to provide a bonded member including different materials which are bonded together, the bonded member having air tightness at the interface between the bonded materials and also having thermal cycle properties and thermal shock properties and being usable at high temperatures; and a production method thereof.

According to the present invention, there is provided a different materials bonded member including a ceramic base and a metallic member, which are bonded to each other with a solder material including Au. The solder material is disposed on a bonding surface of the ceramic base, with an active metal layer or a metalized layer interposed between the ceramic base and the solder material. The metalized layer includes a metal, which is active to a ceramic constituting the ceramic base. The solder material is heated and melted to form a pre-coat layer adhering to the bonding surface. The metallic member is disposed on a surface of the pre-coat layer, with a barrier layer interposed between the ceramic base and the metallic member. The barrier layer includes a material, which protects against or suppresses the diffusion of the metal constituting the metallic member into the solder material. A bonded part is formed by solidifying the pre-coat layer after it is heated and melted under the temperature conditions of between 1070 and 1150° C. to bond the ceramic base and the metallic member.

Furthermore, according to the present invention, there is provided a different materials bonded member including a ceramic base and a metallic member which are bonded to each other with a solder material including Au. The solder material includes a metal, which is active to a ceramic constituting the ceramic base, and is disposed on a bonding surface of the ceramic base, and is heated and melted to form a pre-coat layer adhering to the bonding surface. The metallic member is disposed on a surface of the pre-coat layer, with a barrier layer interposed between the pre-coat layer and the metallic member. The barrier layer includes a material, which protects against or suppresses the diffusion of the metal constituting the metallic member into the solder material. A bonded part is formed by solidifying the pre-coat layer after it is heated and melted under the temperature conditions of between 1070 and 1150° C. to bond the ceramic base and the metallic member.

In the present invention, the barrier layer is preferably formed by plating on the metallic material or bonded to the metallic material beforehand with a solder material whose melting point is higher than 1150° C. In the present invention, the thickness of the pre-coat layer is preferably not less than 20 μm.

Moreover, according to the present invention, there is provided a different materials bonded member including a ceramic base and a metallic member which are bonded to each other with a solder material including Au. The following are disposed in turn on a bonding surface of the ceramic base: an active metal layer or a metalized layer that includes a metal which is active to a ceramic constituting the ceramic base; a solder material; a barrier layer which includes a material which protects against or suppresses the diffusion of the metal component constituting the metallic member into the solder material as an inner layer; and the metallic member. A bonded part is formed by solidifying the solder material after it is heated and melted under the temperature conditions of between 1070 and 1150° C. to bond the ceramic base and the metallic member.

In the present invention, it is preferable that the hardness of the bonded part is at most $Hv_{0.1}100$, the barrier layer is a Cr layer and the material of the metallic member is at least one material selected from the group consisting of Ni, Co, Fe and Cr.

A different materials bonded member according to the present invention is suitably furnished with a chamber for producing a semiconductor therein.

A different materials bonded member according to the present invention is suitably used in a case where the ceramic member is used as a susceptor for disposing a semiconductor wafer on a surface thereof and the metallic member is used as a corrosion-resisting ring used in furnishing the chamber for producing a semiconductor with the susceptor.

A different materials bonded member according to the present invention is suitably used in a case where the bonded part is exposed to both the inert or oxidizing atmosphere outside the semiconductor manufacturing chamber and to the atmosphere inside the semiconductor manufacturing chamber which has a lower pressure than the atmosphere outside the semiconductor manufacturing chamber.

A different materials bonded member according to the present invention is suitable for use in a case where a conductive material comprising Mo, W or an alloy of Mo and W is embedded in the ceramic base with a portion of the surface of the conductive material being exposed from the ceramic base, and the bonded part is formed so as to cover the portion of the surface of the conductive material to bond the ceramic base and the metallic member.

In addition, a different materials bonded member according to the present invention is suitably used in a case where the metallic member is a terminal feeding to the conductive material and the bonded part is exposed to the atmosphere outside the semiconductor-manufacturing chamber.

A different materials bonded member according to the present invention is suitably used as a susceptor for mounting a semiconductor wafer, which has a function of a heater, a function of an electrostatic chuck or serves both of these functions.

Additionally, according to the present invention, there is provided a different materials bonded member including a ceramic base and a metallic member which are bonded to each other with a solder material including Au. The solder material is disposed on a bonding surface of the ceramic base, with an active metal layer or a metalized layer interposed between the solder material and the ceramic base. The active metal layer or metalized layer includes a metal which is active to a ceramic constituting the ceramic base and the solder material is heated and melted to form a pre-coat layer adhering to the bonding surface of the ceramic base. The metallic member which includes Cr or an alloy composed essentially of Cr is disposed on a surface of the pre-coat layer and a bonded part is formed by solidifying the pre-coat layer after it is heated and melted under the temperature conditions of between 1070 and 1150° C. to bond the ceramic base and the metallic member.

Furthermore, according to the present invention, there is provided a different materials bonded member including a ceramic base and a metallic member which are bonded to each other with a solder material including Au. The solder material includes a metal which is active to a ceramic constituting the ceramic base and is disposed on a bonding surface of the ceramic base. The solder material is heated and melted to form a pre-coat layer adhering to the bonding surface the metallic member. The metallic member includes Cr or an alloy composed essentially of Cr and is disposed on a surface of the pre-coat layer and a bonded part is formed by solidifying the pre-coat layer after it is heated and melted under the temperature conditions of between 1070 and 1150° C. to bond the ceramic base and the metallic member.

Additionally, according to the present invention, there is provided a method for producing a different materials bonded member including a ceramic base and a metallic member which are bonded to each other with a solder material including Au. The method includes the steps of disposing the solder material on a bonding surface of the ceramic base, with an active metal layer or a metalized layer interposed between the solder material and the ceramic base. The active metal layer or metalized layer includes a metal which is active to a ceramic constituting the ceramic base. The solder material is heated and melted to form a pre-coat layer adhering to the bonding surface of the ceramic base. The metallic member is disposed on a surface of the pre-coat layer, with a barrier layer interposed between the pre-coat layer and the metallic member. The barrier layer includes a material which protects against or suppresses the diffusion of the metal constituting the metallic member into the solder material. The pre-coat layer is heated and melted under the temperature conditions of between 1070 and 1150° C., and a bonded part is formed by solidifying the pre-coat layer to bond the ceramic base and the metallic member.

Furthermore, according to the present invention, there is provided another method for producing a different materials bonded member including a ceramic base and a metallic member which are bonded to each other with a solder material including Au. The solder material includes a metal which is active to a ceramic constituting the ceramic base. The method includes the steps of disposing the solder material on a bonding surface, heating to melt the solder material to form a pre-coat layer adhering to the bonding surface of the ceramic base, disposing the metallic member on a surface of the pre-coat layer, with a barrier layer interposed between the pre-coat layer and the metallic member and the barrier layer includes a material which protects against or suppresses the diffusion of the metal constituting the metallic member into the solder material, heating and melting the pre-coat layer under the temperature conditions of between 1070 and 1150° C., and forming a bonded part by solidifying the pre-coat layer to bond the ceramic base and the metallic member. In the present invention, the solder material is preferably a mixture of Au powder and a powder of the metal which is active to a ceramic.

In the present invention, it is preferable that the barrier layer is formed by plating the metallic member and/or bonded to the metallic member beforehand with a solder material which has the melting point of 1150° C. or higher. The thickness of the pre-coat layer is preferably at least 20 μm.

Additionally, according to the present invention, there is provided a method for producing a different materials bonded member including a ceramic base and a metallic member which are bonded to each other with a solder material comprising Au. The method includes the steps of disposing in turn on a bonding surface of the ceramic base 1) an active metal layer or a metalized layer that includes a metal which is active to a ceramic constituting the ceramic base, 2) the solder material, 3) a barrier layer that includes a material which protects against or suppresses the diffusion of the metal component constituting the metallic member into the solder material as an inner layer, and 4) the metallic member. The solder material is heated and melted under the temperature conditions of between 1070 and 1150° C., and a bonded part is formed by solidifying the solder material to bond the ceramic base and the metallic member.

In the present invention, it is preferable that the hardness of the bonded part is at most $Hv_{0.1}100$ and the barrier layer is a Cr layer.

In the present invention, it is preferable that a conductive material, which includes Mo, W or an alloy of Mo and W, is embedded in the ceramic base with a portion of the surface of the conductive material being exposed from the ceramic base, and the bonded part is formed so as to cover the portion of the surface of the conductive material to bond the ceramic base and the metallic member.

Moreover, according to the present invention, there is provided another method for producing a different materials bonded member comprising a ceramic base and a metallic member which are bonded to each other with a solder material comprising Au. The method includes the steps of disposing the solder material on a bonding surface of the ceramic base, with an active metal layer or metalized layer positioned on the ceramic base and including a metal which is active to a ceramic constituting the ceramic base, heating to melt the solder material to form a pre-coat layer adhering to the bonding surface, disposing the metallic member including Cr or an alloy composed essentially of Cr on a surface of the pre-coat layer, heating and melting the pre-coat layer under the temperature conditions of between 1070 and 1150° C., and forming a bonded part by solidifying the pre-coat layer to bond the ceramic base and the metallic member.

Furthermore, according to the present invention, there is provided another method for producing a different materials bonded member comprising a ceramic base and a metallic member which are bonded to each other with a solder material comprising Au. The solder material includes a metal which is active to a ceramic constituting the ceramic base. The method includes the steps of disposing the solder material on a bonding surface of the ceramic base, heating to melt the solder material to form a pre-coat layer adhering to the bonding surface of the ceramic base, disposing the metallic member, which includes Cr or an alloy composed essentially of Cr, on a surface of the pre-coat layer, heating and melting the pre-coat layer under the temperature conditions of between 1070 and 1150° C., and forming a bonded part by solidifying the pre-coat layer to bond the ceramic base and the metallic member. In the present invention, it is preferable that the solder material is a mixture of Au powder and a powder of the metal which is active to a ceramic.

In addition, according to the present invention, there is provided another method for producing a different materials bonded member including a ceramic base and a metallic member which are bonded to each other with a solder material comprising Au. The solder material is a solder material including a metal which is active to a ceramic constituting the ceramic base. The method includes the steps of disposing the solder material and the metallic member, which includes Cr or an alloy composed essentially of Cr, in turn on a bonding surface of the ceramic base, heating and melting the solder material under the temperature conditions of between 1070 and 1150° C., and forming a bonded part by solidifying the solder material to bond the ceramic base and the metallic member.

Moreover, according to the present invention, there is provided another method for producing a different materials bonded member including a ceramic base and a metallic member which are bonded to each other with a solder material comprising Au. The method includes the steps of disposing in turn on a bonding surface of the ceramic base an active metal layer or a metalized layer, which includes a metal that is active to a ceramic constituting the ceramic base, the solder material, and the metallic member, which includes Cr or an alloy composed essentially of Cr, heating and melting the solder material under the temperature conditions of between 1070 and 1150° C., and forming a bonded part by solidifying the solder material to bond the ceramic base and the metallic member. In the present invention, it is preferable that the solder material is a mixture of Au powder and a powder of the metal which is active to a ceramic.

DETAILED DESCRIPTION OF THE INVENTION

Hereinafter, embodiments of the present invention will be described with reference to the drawings. However, the present invention shall not be limited to the following embodiments. It should be understood that modifications and alterations with respect to its design will be made as required based on general knowledge of those skilled in the art without deviating from the scope and spirit of the present invention.

Figure 1:
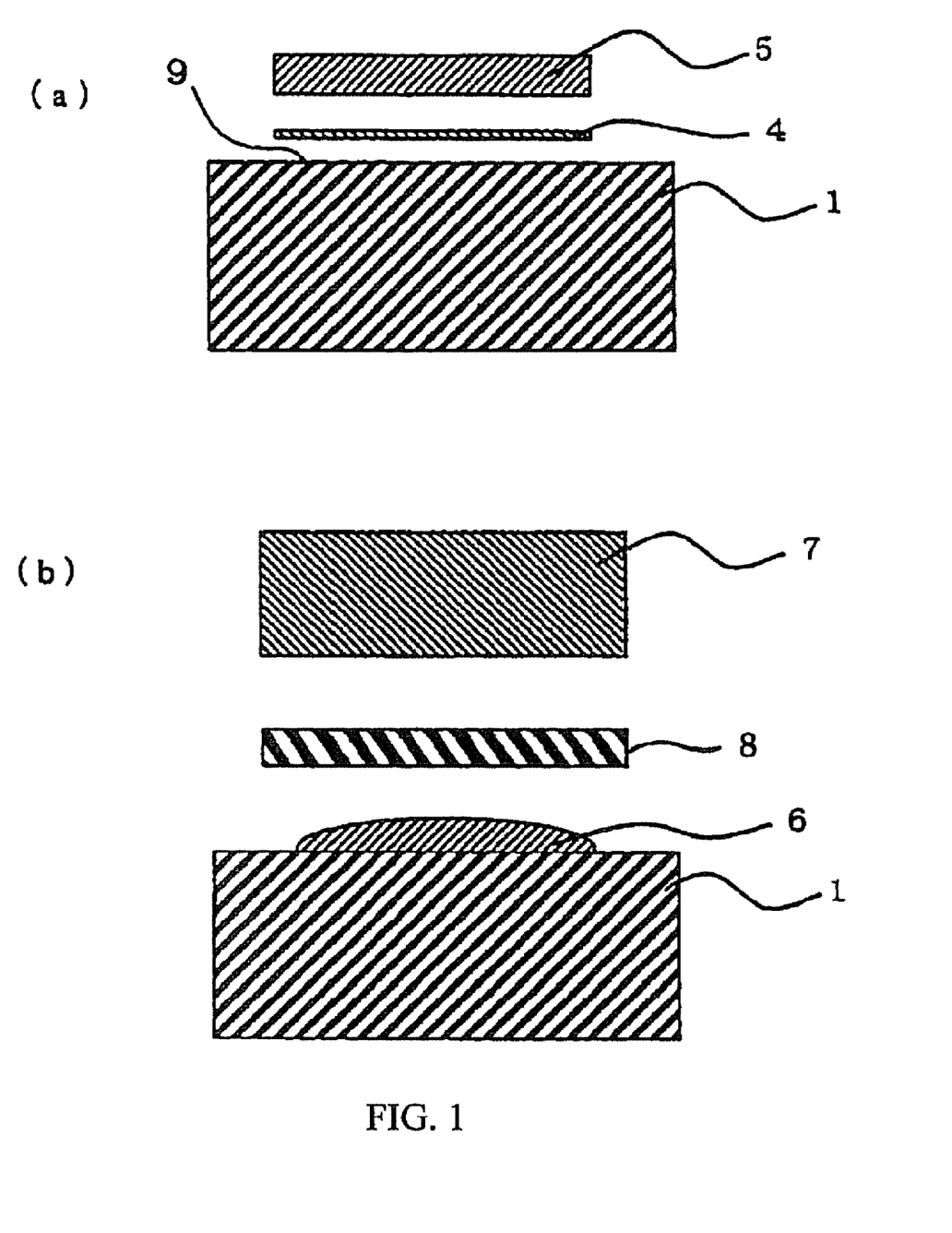
FIGS. 1(a) and 1(b) are cross-sectional views of components of a different materials bonded member illustrating one embodiment of a production method according to the present invention.

FIGS. 1(a) and 1(b) are cross-sectional views of the components of a different materials bonded member and show one embodiment of a production method according to the present invention. For producing a different materials bonded member in this embodiment, first of all, a solder material 5 is disposed on a bonding surface 9 of the ceramic base 1, which has an active metal layer 4 including a metal which is active to a ceramic constituting the ceramic base 1 disposed thereon, and the solder material 5 is heated and melted to form a pre-coat layer 6 adhering to the bonding surface 9. Then, the metallic member 7 is disposed on a surface of the pre-coat layer 6, with a barrier layer 8 interposed between the solder material 5 and the metallic member 7. The barrier layer 8 includes a material which protects against or suppresses the diffusion of the metal constituting the metallic member 7 into the solder material 5. A bonded part is formed by solidifying the pre-coat layer 6 after it is heated and melted under the temperature conditions of between 1070 and 1150° C. to bond the ceramic base 1 and the metallic member 7.

The solder material 5 includes Au, which is a soft metal having a low proof stress property and has a characteristic of relaxing the thermal stress generated by thermal shock through plastic deformation. Consequently, the different materials bonded member in this embodiment, which employs the soldering material comprising Au, has not only excellent thermal cycle properties and thermal shock resistance, but also good bonding strength and airtightness. In addition, the amount of the Au soldering material to be used, although varying according to the shape of the bonded portion and other factors, may be adjusted within a range in which the Au soldering material can be molten by heating. However, it is necessary to adjust the amount of the solder material used so that the components constituting the solder material 5 or formed pre-coat layer 6 and the components constituting metallic member 7 via barrier layer 8 may not diffuse into each other directly.

The active metal layer includes metals which are active against the ceramic constituting the ceramic base. The active metal layer dissolves in the solder material 5, and forms a reaction product layer, such as a nitride layer with the ceramic base 1. Thereby, the wettability of the solder material 5 to the ceramic base 1 is improved, and a pre-coat layer 6 having good air tightness is formed. A material of the active metal layer 4 is preferably at least one metal selected from the group consisting of Ti, Nb, Hf and Zr. Since these metals are completely consumed at the interface on the solder material 5 and hardly remain in the solder material, the strength of the solder material 5 may be kept low and the contact part having reliable air tightness can be formed. Consequently, a different materials bonded member having long-term reliability may be attained. The active metal is preferably in the form of foil. In addition, it may take the form of a paste material or a film, as well as a thin film formed on the bonding surface 9 by sputtering.

For example, in a case where AlN (aluminum nitride) is used as a ceramic constituting the ceramic base and Ti is used as a metal constituting the active metal layer, a thin film layer including TiN (titanium nitride) is formed at the interface on the ceramic base by heating and melting the solder material. At this time, since Ti is wholly consumed in a reaction with AlN, Ti does not form a solid solution with the solder material, and a pre-coat layer having a low proof stress, which the solder material has, is formed. In this case, the amount of Ti is preferably 0.03 to 10% by mass, more preferably 0.1 to 2% by mass, based on the solder material. When the amount is below 0.03% by mass, the wettability between the ceramic base and the solder material is insufficient, while when the amount exceeds 10% by mass, Ti remains in the solder material and the proof stress of the solder material is increased, whereby the ceramic base may be cracked and/or a brittle interface layer may be disadvantageously formed.

Since the different materials bonded member according to the present invention has a barrier layer at the bonded part, the diffusion of metal components constituting the metallic material, which form a solid solution with the solder material, harden the solder material and increase the proof stress of the solder material, into the solder material is effectively prevented. Accordingly, product deficiency of the ceramic base such as a crack or separation hardly occurs, and even when placed at high temperatures, the increasing of the proof stress of the solder material is suppressed. Therefore, the different materials bonded member according to the present invention is a bonded member wherein a crack or separation hardly occurs in the ceramic base thereof, because the bonding strength between the ceramic base and metallic material is maintained, even in the event of repeated rises and descents in the temperature of the bonded member.

In a case where the temperature of heating and melting the pre-coat is below 1070° C., in relation to the melting point of Au constituting the solder material, the pre-coat layer cannot, to a substantial degree, disadvantageously melt, while when the temperature is over 1150° C., the metal component constituting the barrier layer tends to disadvantageously form a solid solution gradually in the solder material. Meanwhile, from the viewpoint of giving more excellent thermal cycle properties and thermal shock properties, the temperature of the heating and melting of the pre-coat layer is preferably 1070-1100° C.

Furthermore, in the present invention, the period of heating and melting the pre-coat layer is not particularly limited, and may be set up within a range in which the pre-coat layer can melt sufficiently and the metal component constituting the barrier layer cannot gradually form a solid solution in the solder material. The pre-coat layer heating and melting period fluctuates according to the size of the different materials bonded member, for example, the heating and melting period may be not more than 30 minutes.

Furthermore, as shown in FIGS. 1(a) and 1(b), the formation of the pre-coat layer 6 and the bonding of barrier layer 8 and metallic material 7 may be carried out separately in 2 steps, or may be conducted simultaneously in 1 step. However, the above processes are preferably carried out in individual processes separated in 2 steps as shown in FIGS. 1(a) and 1(b), because it is preferable to have a shorter contacting period of the barrier layer 8 and the solder material, which includes Au and is heated and melted.

Moreover, in the different materials bonded member according to the prevent invention, the solder material may be placed on a metalized layer in place of above-mentioned active metal layer (See FIG. 1(a)). The metalized layer may be formed on the surface of the ceramic base bonding surface 9 by means of an ordinary metallizing process, for example formed by the use of a paste or by a vapor phase process. As a metal constituting the metalized layer, W, Mo, Mo—Mn, W—Mn or these metals with additives such as $SiO_2$ and $TiO_2$ can be suitably used.

Moreover, according to the present invention, there is provided a different materials bonded member and the production method thereof wherein the solder material is a solder material including a metal which is active to a ceramic constituting the ceramic base. The solder material is disposed on a bonding surface of the ceramic base and is heated and melted to form a pre-coat layer adhering to the bonding surface. A metallic member is disposed on a surface of the pre-coat layer, with a barrier layer interposed between the pre-coat layer and the metallic member. The barrier layer includes a material which protects against or suppresses the diffusion of the metal constituting the metallic member into the solder material. A bonded part is formed by solidifying the pre-coat layer after it is heated and melted under the temperature conditions of between 1070 and 1150° C. to bond the ceramic base and the metallic member.

That is, the solder material is used in place of the active metal layer 4 and solder material 5 combination shown in FIG. 1(a). By employing such constitution, the diffusion of metal component constituting the metallic member into the solder material is suppressed effectively and the different materials bonded member which has excellent various properties such as thermal cycle properties, thermal shock resistance, oxidation resistance and others can be produced. The solder material including an active metal according to the present invention signifies a material involving a metal which is active to a ceramic constituting the ceramic base. As a metal which is active to a ceramic, the metals which are listed as a metal constituting the above-mentioned active metal layer are suitably employed. These metals not only improve the wettability of the solder material with respect to the ceramic base, but hardly remain in the solder material, and thus maintain the proof strength of the solder material. Moreover, since the bonded part having reliable air tightness can be formed, a different materials bonded member having long-term reliability may be attained.

The amount of metal is preferably 0.03 to 10% by mass, more preferably 0.1 to 2% by mass, based on Au which is an essential component of the solder material that includes an active metal. When the amount is below 0.03% by mass, the wettability between the ceramic base and the solder material which includes an active metal is insufficient, while when the amount exceeds 10% by mass, the metal remains in the solder material and the proof stress of the solder material is increased, whereby the ceramic base may be cracked and/or a brittle interface layer may be disadvantageously formed. Meanwhile, a mixture of Au powder and a powder of the metal which is active to a ceramic can be suitably used as the solder material in addition to an alloy of Au and the aforementioned metal which is active to the ceramic.

In the prevent invention, the barrier layer may be formed by plating on the metallic material. Namely, the diffusion of the metal component of the metallic material 7 into the solder material is suppressed by plating the barrier layer on the face of the metallic material 7 which contacts to pre-coat layer 6 in place of the barrier layer 8 shown in FIG. 1(b). For example, when Cr is employed as the metal constituting the barrier layer, as for Cr plating, normal Cr plating and double Cr plating, which is defined in JIS H8615 "Cr Plating for Industrial Applications," can each be suitably used. Porous Cr plating or crack Cr plating may also be used. In addition, from the point of view of bringing out the sufficient diffusion suppress effect, the thickness of the plating layer is preferably not less than 20 μm.

Moreover, in the present invention, the barrier layer may be bonded to the metallic member with a solder material whose melting point is higher than 1150° C. That is, the diffusion of the component of the metallic member into the solder material is suppressed by using the barrier bonded to the metallic member layer beforehand with the such a solder material, of which the melting point is higher than the temperature used to heat and melt the solder material constituting the pre-coat. The melting point of the third solder material used to bond the barrier and metallic members to one another may exceed 1150° C. The upper limit of the melting point is not confined, but it may be below 1400° C. on the whole, considering the handling as a solder material.

In addition, AWS4783(Co-19Cr-8Si-4W-0.8B), AMS4782(Ni-19Cr-10Si-0.1C) or the like can be listed as a concrete example of the solder material used to bond the barrier and metallic members to one another.

In order to reduce the residual stress at the time of bonding, the thickness of the pre-coat layer is preferably at least 20 μm, more preferably at least 200 μm, and particularly preferably at least 500 μm. However, considering that the solder material comprising Au is expensive, it is not preferable in light of the material cost that the thickness is more than 2 mm. Furthermore, the proof stress value also becomes low, so that the Vickers hardness of the bonded part is close to that of pure gold (Au) annealed, $Hv_{0.1}30$, and therefore the stress relaxing effect increases and the residual stress of the bonded part is reduced. Consequently, in order to efficiently avoid defects at the time of bonding and problems during thermal cycling, the Vickers hardness of the bonded part is preferably below $Hv_{0.1}100$, more preferably below $Hv_{0.1}80$, and particularly preferably below $Hv_{0.1}60$. It is also preferable that the ceramic base includes aluminum nitride having a flexural strength of about 300 to 400 MPa.

Figure 2:
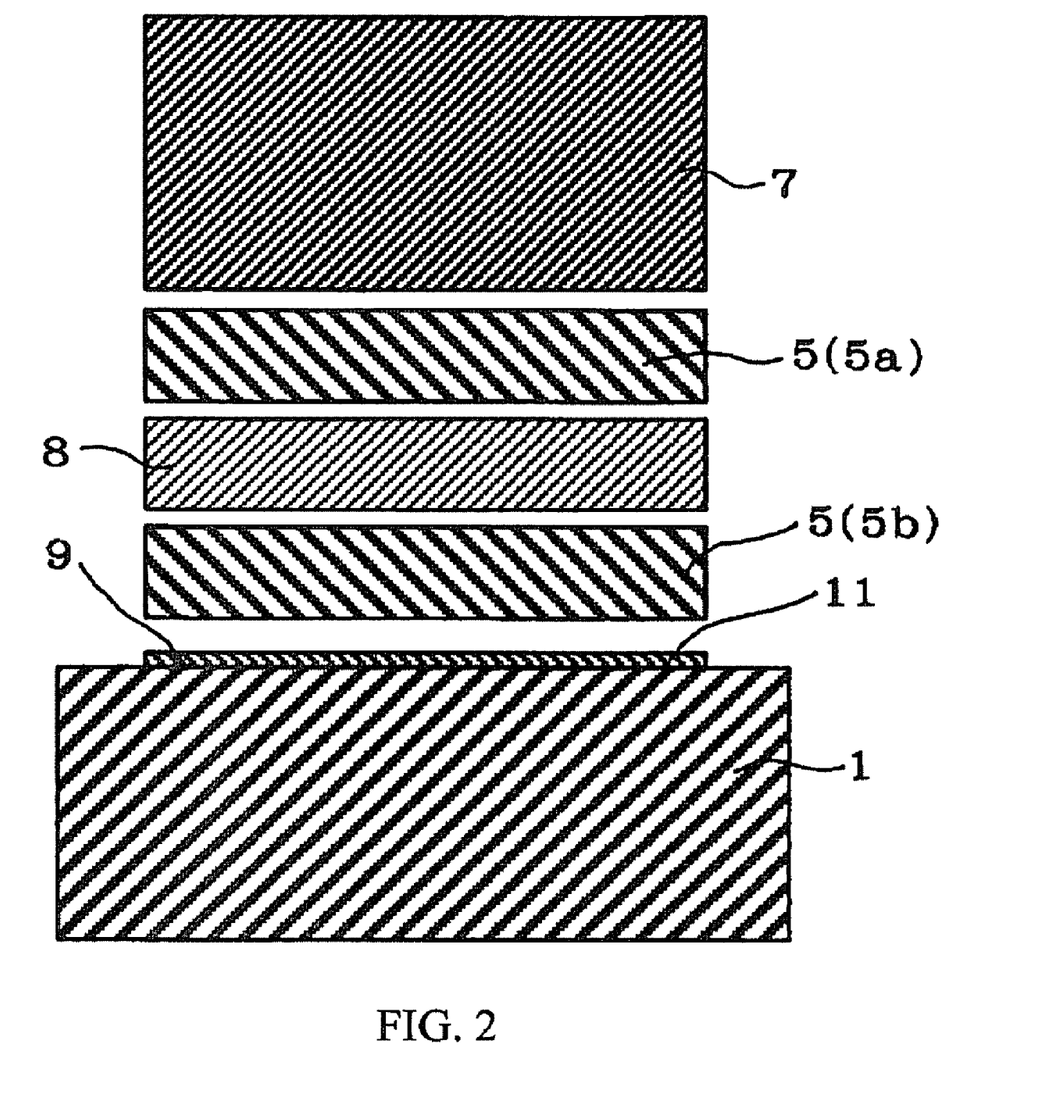
FIG. 2 is a cross-sectional view of components of a different materials bonded member showing another embodiment of the production method according to the present invention.

FIG. 2 shows a cross-sectional view of the bonded member and illustrates another embodiment of the production method of a different materials bonded member according to the present invention. In order to produce the different materials bonded member in this embodiment, the following are disposed in turn on a bonding surface 9 of ceramic base 1: the metalized layer 11; the solder material 5b; the barrier layer 8; the solder material 5a; and metallic member 7. The solder materials 5a and 5b are heated and melted under the temperature conditions of between 1070 and 1150° C. A bonded part is formed by solidifying the solder materials, and the ceramic base 1 and the metallic member 7 are bonded to each other. The different materials bonded member according to this embodiment is produced by above production method.

Namely, the ceramic base and the metallic member are bonded to each other in one heat treatment without forming a pre-coat layer. By employing such a constitution, the diffusion of the metal component constituting the metallic member into the solder material is suppressed effectively and the different materials bonded member can be produced to have excellent various properties such as thermal cycle properties, thermal shock resistance, oxidation resistance and the like.

Moreover, in the present invention, the active metal layer may be disposed in place of the metalized layer shown in FIG. 2. In addition, the solder materials 5a and 5b are preferably solder materials including Au. However, the solder material 5a which contacts to metallic member 7 may be a solder material that excludes Au.

Furthermore, in the present invention, the barrier layer preferably includes Cr. Cr is preferable because it effectively protects against or suppresses the diffusion of the metal constituting the metallic member, especially Ni, into the solder material. Additionally, Cr is preferable because it is inexpensive and easy to handle. Moreover, even if Au is dissolved in Cr, Au is not easily hardened, and thus there is little possibility that the barrier layer itself impairs the low proof stress properties of the soldering material. Further, assuming that Ti is used as the metal constituting the active metal layer, Ti is not drawn to Cr, unlike when Pt is used, due to a low affinity between Cr and Ti, and accordingly Ti advantageously used as the active metal because the strength of the bonded portion is not lowered. The thickness of the barrier layer is not particularly limited, and is preferably about 0.3 to 3 mm, considering that the tractility of Cr is low and members are produced by the cutting of a cast member.

The ceramic base is preferably at least one ceramic selected from the group consisting of aluminum nitride, silicon nitride, alumina, zirconia, magnesia, spinel and silicon carbide. By means that the foregoing ceramics may constitute the ceramic base alone or in combination, different materials bonded members having heat resistance, hardness and other properties corresponding to applications and apparatuses being integrated with these bonded members can be provided.

In the present invention, a metal constituting the metallic member is preferably at least one selected from the group consisting of Ni, Co, Cr and Fe. Particularly, Ni and an Ni-based alloy have excellent heat resistance and oxidation resistance as well as excellent stability in a high-temperature atmosphere for a long time without coating. Moreover, the content of at least one selected from the group consisting of Ni, Co, Cr and Fe by percentage is preferably more than that of rendering physical properties significantly, in concrete terms that of total content of Ni, Co, Cr and Fe is more than 50% by mass. Illustrative examples of such an alloy include Inconel 600, Inconel 601, Nimonic 90, Pyromax, Incolloy 800, Incolloy 903, Hastelloy and Kovar.

These metals and alloys are hardly oxidized in an oxidation resistance test conducted in air at 800° C. They have oxidation resistance required for them to be used as a constituent such as a feeding metal terminal of a susceptor for mounting semiconductor wafers which is used in production of semiconductors and has a function of a heater as well as excellent conductivity required for them to be used as a metal terminal. Therefore, these metals are not only suitable for the member of the high-temperature heater also preferable in that they are inexpensive and easy to obtain. In addition, the foregoing metal member is not limited to the shape shown in FIG. 1(b), and a variety of shapes such as a cylinder, prism, steeple, ring and the like can be used.

By taking advantage of above-mentioned excellent various properties such as thermal cycle properties, thermal shock resistance, oxidation resistance and others, the different materials the bonded member of the present invention is suitably installed. From the same perspective, the bonded member is suitably applied in a case that the ceramic base is a susceptor for disposing a semiconductor wafer and the metallic member is a metallic member which is directly bonded to the susceptor, for example a corrosion-resisting ring for mounting the susceptor to the semiconductor-producing chamber, a heater embedded in the susceptor or a feeding terminal for a high-frequency terminal. Furthermore, the bonded member is suitably used in a case where the bonded part is exposed to both the inert or oxidizing atmosphere outside the semiconductor manufacturing chamber, and to the atmosphere inside the semiconductor manufacturing chamber which has a lower pressure than the atmosphere outside the semiconductor manufacturing chamber.

Figure 3:
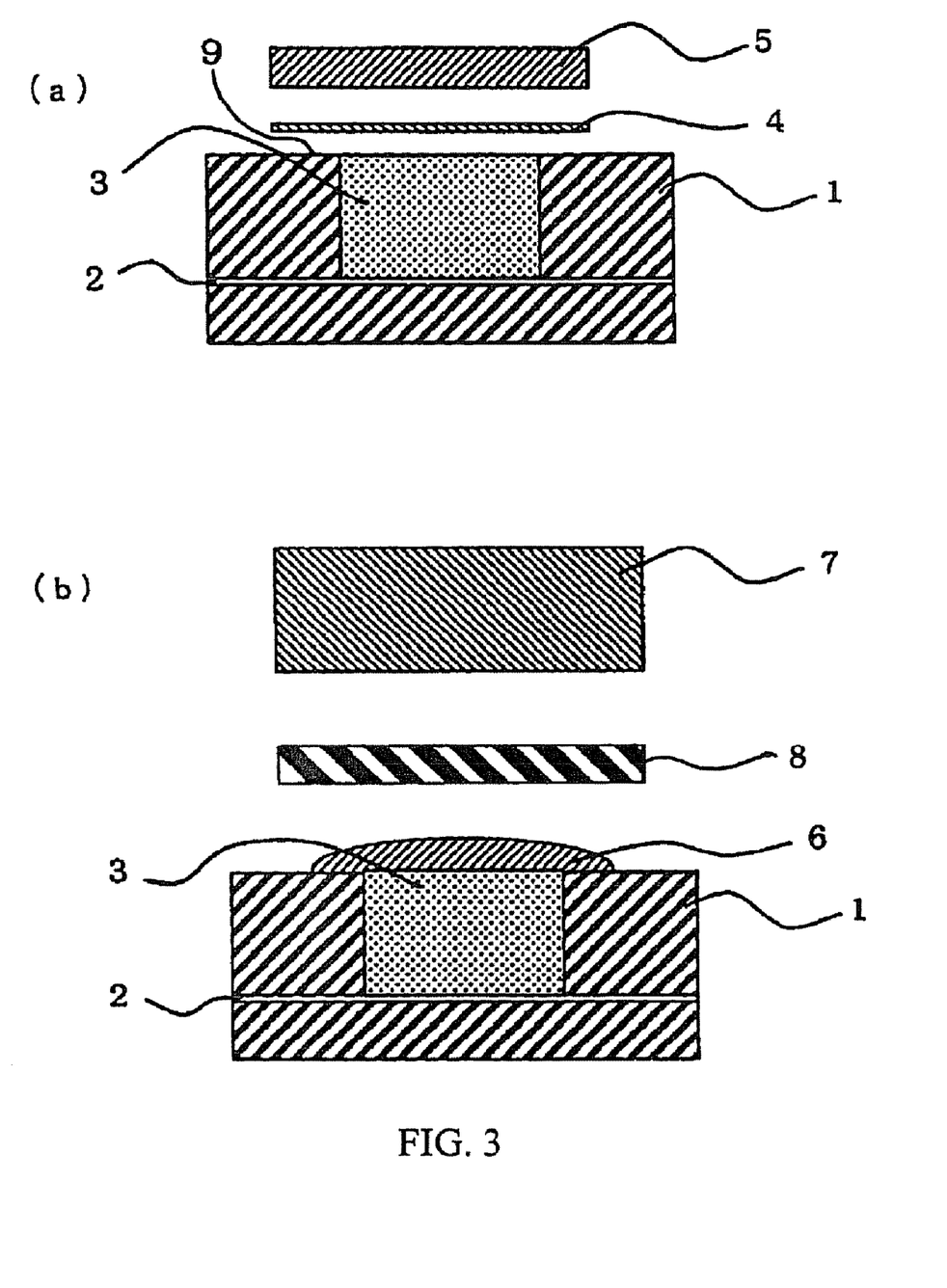
FIGS. 3(a) and 3(b) are cross-sectional views of components of a different materials bonded member showing still another embodiment of a production method according to the present invention.

FIGS. 3(a) and 3(b) show cross-sectional views of the bonded member and illustrate still another embodiment of the production method of a different materials bonded member according to the present invention. In the present invention, it is preferable that a conductive material 3 including Mo, W or an alloy of Mo and W is embedded in the ceramic base 1 with a portion of the surface of the conductive material 3 exposed from the ceramic base 1. A bonding layer is formed so as to cover the portion of the surface of the conductive material, and the bonding layer forms a solidified bonded part to bond the ceramic base 1 and the metallic member 7.

As shown in FIGS. 3(a) and 3(b), the conductive material 3 embedded in the ceramic base 1 includes a conductive metal such as Mo. In addition, a metal mesh 2 includes, for example, Mo and is embedded in the ceramic base and conducts with the conductive material 3 in the ceramic base 1. In this embodiment, the active metal layer 4 and the solder material 5 are disposed on a portion of the ceramic base 1 and cover a part of the surface of the conductive material 3 (the exposed part). The pre-coat layer 6 is formed by heating the active metal layer 4 and the solder material 5. After the metallic member 7, which includes a barrier layer that includes Cr, for example, is disposed on the surface of the pre-coat layer 6, the ceramic base 1 and the metallic member 7 are bonded together by heating under a given temperature.

Since wettability between the solder material and the ceramic base 1 is good and the bonded part is formed under the condition that the airtightness is assured, the conductive material 3 is not exposed to the air. Therefore, the different materials bonded member according to this embodiment has an advantage that the oxidative deterioration of the conductive member 3 hardly occurs. The different materials bonded member having such advantage has a suitable characteristic in a case where the metallic member is a terminal feeding to the conductive material and the bonded part is exposed to the inert or oxidizing atmosphere outside the semiconductor-manufacturing chamber when the bonded member is installed in the semiconductor-manufacturing chamber.

Furthermore, the different materials bonded member according to the present invention hardly undergoes a reduction in strength caused by heat and is excellent in anti-thermal cycle properties and thermal shock resistance. Accordingly, it can be suitably employed as a susceptor for mounting a semiconductor wafer which has a function of a heater in a semiconductor producing system, more specifically, as a bonded member incorporated into equipment which exhibits a function of an electrostatic chuck or a function of a heater by an internal metal electrode or metal heating unit. Further, the different materials bonded member according to the present invention is suitably used as a bonded member as shown in FIG. 5 which is formed by bonding a ceramic susceptor 22 for mounting a semiconductor wafer to a corrosion-resistant metal ring 23 for attaching the susceptor 22 to a chamber 21 for producing a semiconductor. And the thermal stress which occurs can still be alleviated even if the bonded part does not take the form shown in FIG. 6 or 7.

Furthermore, in the present invention, there is provided a different materials bonded member and a production method thereof wherein a solder material is disposed on a bonding surface of the ceramic base, which includes an active metal layer or a metalized layer on a surface thereof. The active metal or metalized layer includes a metal which is active to a ceramic constituting the ceramic base. The solder material is heated and melted to form a pre-coat layer adhering to a bonding surface of the ceramic base. The metallic member, which includes Cr or an alloy composed essentially of Cr, is disposed on a surface of the pre-coat layer and a bonded part is formed by solidifying the pre-coat layer after it is heated and melted under the temperature conditions of between 1070 and 1150° C. to bond the ceramic base and the metallic member together.

That is, a member including Cr or an alloy composed essentially of Cr is used as the metallic member to be bonded in place of the barrier layer 8 preventing or suppressing the diffusion into the solder material (see FIG. 1(b)), and the member is disposed on the surface of the pre-coat layer, and the different materials bonded member is produced by heating them under a given temperature to bond the ceramic base and the metallic member together. By employing such constitution, in the different materials bonded member according to the present invention, the diffusion of a metal component constituting the metallic member into the solder material is suppressed effectively and the different materials bonded member which has excellent various properties such as thermal cycle properties, thermal shock resistance, oxidation resistance and others can be produced.

Furthermore, in the present invention, there is provided a different materials bonded member and the production method thereof wherein the bonded member is a different materials bonded member including a ceramic base and a metallic member which are bonded to each other with a solder material composed essentially of Au. The solder material includes a metal which is active to the ceramic constituting the ceramic base and is disposed on a bonding surface of the ceramic base. The pre-coat layer, which adheres to the bonding surface of the ceramic base, is formed by heating and melting the solder material. The metallic member, which includes Cr or an alloy composed essentially of Cry is disposed on a surface of the pre-coat layer and the pre-coat layer is heated and melted under the temperature conditions of between 1070 and 1150° C. A bonded part is formed by solidifying the pre-coat layer to bond the ceramic base and the metallic member.

That is, the solder material is used in place of the combination of the active metal layer 4 and the solder material 5 (see FIG. 1(a)), while a member including Cr or an alloy composed essentially of Cr is used as the metallic member to be bonded in place of the barrier layer 8 (see FIG. 1(b)), and is disposed on the surface of the pre-coat layer. The different materials bonded member is produced by heating the above-discussed members under a given temperature to bond the ceramic base and the metallic member together. By employing such a constitution, in the different materials bonded member according to the present invention, the diffusion of metal component constituting the metallic member into the solder material is suppressed effectively and the different materials bonded member which has excellent various properties such as thermal cycle properties, thermal shock resistance, oxidation resistance and others can be produced.

Furthermore, in the present invention, there is provided a different materials bonded member and the production method thereof wherein the following are disposed in turn on a bonding surface of a ceramic base: a metal layer or metalized layer, which includes a metal which is active to a ceramic constituting the ceramic base; a solder material; and a metallic member comprising Cr or an alloy composed essentially of Cr. A bonded part is formed by solidifying the solder material after it is heated and melted under the temperature conditions of between 1070 and 1150° C. to bond the ceramic base and the metallic member together. Namely, the ceramic base and the metallic member are bonded to each other in one heat treatment without forming the above-discussed pre-coat layer. By employing such a constitution, the diffusion of the metal component constituting the metallic member into the solder material is effectively suppressed and the different materials bonded member which has excellent various properties such as thermal cycle properties, thermal shock resistance oxidation resistance and others can be produced.

Moreover, in the present invention, there is provided a different materials bonded member and the production method thereof wherein the bonded member is a different materials bonded member including a ceramic base and a metallic member which are bonded to each other with a solder material composed essentially of Au. The solder material includes a metal which is active to the ceramic constituting the ceramic base. The solder material and the metallic member including Cr or an alloy composed essentially of Cr are disposed in turn on the bonding surface of the ceramic base, and a bonded part is formed by solidifying the solder material after it is heated and melted under the temperature conditions of between 1070 and 1150° C. to bond the ceramic base and the metallic member together.

That is, a member including Cr or an alloy composed essentially of Cr is used as the metallic member to be bonded in place of the barrier layer 8 (see FIG. 1(b)) and the ceramic base and the metallic member are bonded to each other in one heat treatment without forming a pre-coat layer, and the different materials bonded member is produced in the foregoing way. By employing such a constitution, the diffusion of the metal component constituting the metallic member into the solder material is effectively suppressed and the different materials bonded member which has excellent various properties such as thermal cycle properties, thermal shock resistance oxidation resistance and others can be produced.

EXAMPLES

Hereinafter, examples of the present invention will be described. The present invention, however, is not limited to the following examples.

Examples 1 to 3

On a ceramic base comprising AlN (sintered body with an AlN purity of 99.9%, flexural strength: 360 MPa), 5 μm Ti foil, a 500 μm pure Au soldering material, 1000 μm Cr sheet, a 500 μm pure Au soldering material, and an Ni terminal were placed in such turn, and the solder materials were molten by heating to bond the ceramic base and the Ni terminal in a vacuum atmosphere at 1,070° C. for 1 minute (Example 1), at 1,070° C. for 10 minutes (Example 2), and at 1,070° C. for 20 minutes (Example 3). After completion of the heat treatments, the bonded members were left as they were for slow cooling and thereby the bonded members of Examples 1-3 were obtained.

Evaluation of a State of Diffusion

The state of diffusion in the bonded members of Examples 1-3 were evaluated by measuring the amount of penetration of Au and Cr at the interface between Au and Cr. More specifically, the amount of the reduction in thickness of the Cr was adopted as a evaluation index, because Cr was lost or eroded by Au from the interface between Au and Cr.

As a result, 22 μm, 30 μm and 39 μm of Cr was lost or eroded in Examples 1, 2 and 3, respectively.

Example 4 and 5

On a ceramic base comprising AlN (sintered body with an AlN purity of 99.9%, flexural strength: 360 MPa), 5 μm Ti foil, a 5000 μm pure Au soldering material, 1000 μm Cr sheet, a 500 μm pure Au soldering material, and an Ni terminal were placed in such turn, and the solder materials were molten by heating to bond the ceramic base and the Ni terminal in a vacuum atmosphere at 1,070° C. for 1 minute. After completion of the heat treatment, one bonded member was slowly cooled and thereby the bonded member of Example 4 was obtained. Another bonded member was heated at 800° C. for 100 hours continuously and cooled slowly after that, thereby the bonded member of Example was obtained.

Comparative Examples 1 and 2

The procedure for the foregoing Examples 1 and 2 was repeated except that a Cr sheet was not used and only one layer of 500 μm pure Au soldering material was used, and thereby the bonded members of Comparative Examples 1 and 2 were obtained.

Evaluation of States of Diffusion of Metal Components at the Bonded Part

The states of diffusion of the metal components at the bonded part of the bonded members in Examples 4, 5 and Comparative Examples 1 and 2 were evaluated. More specifically, in the bonded members of Examples 4 and 5, the concentrations (wt %) of Cr and Ni at the center portion of the bonded part formed by the solder material disposed under the Cr sheet (ceramic base side) were measured. Meanwhile, in the bonded member of Comparative Examples 1 and 2, the concentrations (wt %) of Cr and Ni at about the center portion of the bonded part were measured. The measurement of the concentrations was carried out by EDS analysis. The results are shown in TABLE 1.

Measurements of Hardness Distribution of Bonded Part

The hardness of each bonded part in Examples 4 and 5, and Comparative Example 1 and 2 was measured. More specifically, in the bonded members of Examples 4 and 5, the measurements were carried out at three positions, (1) 100 μm below the Cr sheet, (2) 250 μm below the Cr sheet (central part) and (3) 400 μm below the Cr sheet in the bonded part formed from the solder material disposed under the Cr sheet (ceramic base side). And in the bonded members of Comparative Examples 1 and 2, the measurements were carried out at three positions, (4) 100 μm below the Ni terminal, (5) 250 μm below the Ni terminal (central part) and (6) 400 μm below the Ni terminal. Measurements of hardness (Vickers hardness ($Hv_{0.1}$)) was carried out based on the JIS Z2244 Standard. The results are shown in Table 1, where (1) to (6) in "measurement position" correspond to above-mentioned position (1) to (6) respectively.

TABLE 1

| | Metal Density | Vickers Hardness ($Hv_{0.1}$) Measurement Point | | | | | |
|---|---|---|---|---|---|---|---|
| | (mass %) | 1 | 2 | 3 | 4 | 5 | 6 |
| Example 4 | Au—2.3Cr—0.25Ni | 84 | 63 | 58 | | | |
| Example 5 | Au—3.8Cr—0.4Ni | 91 | 56 | 47 | | | |
| Comparative Example 1 | Au—27Ni | | | | 180 | 185 | 193 |
| Comparative Example 2 | Au—37Ni | | | | 175 | 220 | 262 |

Results

As is clear from the results shown in Table 1, it has been found that the increases of hardness of bonded members in Examples 4 and 5 are not remarkable in comparison to that in Comparative Examples 1 and 2. Furthermore, when visual observation was carried out so as to check the presence or absence of occurrence of bonding defects such as breakage and separation of the ceramic base at the bonded part of each bonded member, it has been found that no bonding defects had occurred in the bonded member of Examples 4 and 5. On the contrary, bonding defects did not occur in the bonded member of Comparative Example 1, but the occurrence of breakage was formed in the ceramic base of the bonded member of Comparative Example 2, which had been obtained by heating the bonded member of Comparative Example 1 after it was bonded found.

As described above, the different materials bonded member according to the present invention is formed by bonding the ceramic base and the metallic member to each other through a prescribed bonded part. Consequently, the bonded member of the present invention not only has air tightness at the bonded part but also can be used at high temperatures with excellent thermal cycle properties and thermal shock properties.

Further, according to the method for producing a different materials bonded member according to the present invention, the ceramic base and the metallic member are bonded together by means of forming the bonded part by the prescribed process. Consequently, there can be produced a different materials bonded member which has air tightness at the bonded part having excellent thermal cycle properties and thermal shock properties and is usable at high temperatures.

What is claimed:

1. A different materials bonded member, comprising:
   a metallic member;
   a ceramic base having a bonding surface;

a solder material comprising Au interposed between said ceramic base and said metallic member, and including a metal which is active to a ceramic constituting said ceramic base formed on at least a portion of said bonding surface; and a barrier layer interposed between said ceramic base and said metallic member, said barrier layer comprising chromium (Cr) which protects against or suppresses the diffusion of a metal constituting said metallic member into said solder material, wherein said ceramic base and said metallic member are bonded to one another via said solder material which is disposed on said bonding surface and is heated and melted such that said metal which is active to the ceramic constituting said ceramic base is completely consumed at the interface of said solder material and said ceramic base to form a pre-coat layer adhering to said bonding surface, said metallic member is disposed on a surface of said pre-coat layer and a bonded part is formed by solidifying said pre-coat layer after said pre-coat layer is heated and melted at a temperature between 1070 and 1150° C. to bond said ceramic base and said metallic member to one another.

2. A different materials bonded member, comprising:

a metallic member;

a ceramic base having a bonding surface;

an active metal layer disposed on said bonding surface of said ceramic base, said one of said active metal layer comprising a metal which is active to a ceramic constituting said ceramic base;

a solder material interposed between said metallic member and said ceramic base, and disposed on said active metal layer, said solder material comprising Au; and a barrier layer interposed between said solder material and said metallic member, said barrier layer comprising chromium (Cr) which protects against or suppresses the diffusion of a metal component constituting said metallic member into said solder material, wherein said solder material is heated such that said active metal layer dissolves within said solder material and is completely consumed at the interface of said solder material and said ceramic base and wherein, said ceramic base and said metallic member are bonded to one another via said solder material and a bonded part is formed by solidifying said solder material after said solder material is heated and melted at a temperature between 1070 and 1150° C. to bond said ceramic base and said metallic member to one another.

3. A different materials bonded member comprising:

a ceramic base having a bonding surface, an active metal layer formed of a metal that is active with respect to a material of said ceramic base, formed on at least a portion of said bonding surface;

a solder material comprising Au;

a metallic member; and a barrier layer interposed between said ceramic base and said metallic member, said barrier layer comprising chromium (Cr) which protects against or suppresses the diffusion of a metal from said metallic member;

wherein said solder material and said active metal layer are heated such that said active metal layer dissolves within said solder material and is completely consumed at the interface of said solder material and said ceramic base to form a pre-coat layer adhering to said bonding surface of said ceramic base, and while said pre-coat layer is melted at a temperature between 1070° C.-1150° C., said ceramic base and said metallic member are joined, and thereafter said pre-coat layer is cooled and solidifies to form a bonded part comprising said ceramic base and said metallic member.

4. A different materials bonded member according to claim 3, wherein the barrier layer is formed by plating the metallic member.

5. A different materials bonded member according to claim 3, wherein said barrier layer is bonded to said metallic member beforehand via a solder material having a melting point that is higher than 1150° C.

6. A different materials bonded member according to claim 3, wherein a thickness of said pre-coat layer is at least 20 μm.

7. A different materials bonded member according to claim 3, wherein the hardness of the bonded part is at most $Hv_{0.1}$ 100.

8. A different materials bonded member according to claim 3, wherein the metallic member comprises at least one material selected from the group consisting of Ni, Co, Fe and Cr.

9. A different materials bonded member according to claim 3, wherein the bonded member includes a chamber for producing a semiconductor therein.

10. A different materials bonded member according to claim 9, wherein the ceramic base is a susceptor for disposing a semiconductor wafer on a surface thereon and the metallic member is a corrosion-resisting ring for furnishing the chamber for producing a semiconductor with the susceptor.

11. A different materials bonded member according to claim 9, wherein the bonded part is exposed to inert and oxidizing atmospheres outside of the semiconductor manufacturing chamber and is exposed to an atmosphere inside of the semiconductor manufacturing chamber having a pressure that is lower than the pressure of the atmosphere outside of the semiconductor manufacturing chamber.

12. A different materials bonded member according to claim 3, further comprising a conductive material including at least one of Mo and W or an alloy thereof embedded in the ceramic base with a portion of the surface of the conductive material being exposed from the ceramic base, and the bonded part is formed so as to cover the portion of the surface of the conductive material to bond the ceramic base and the metallic member.

13. A different materials bonded member according to claim 12, wherein the metallic member is a terminal feeding to the conductive material and the bonded part is exposed to an atmosphere outside of the semiconductor manufacturing chamber.

14. A different materials bonded member according to claim 3, wherein the bonded member comprises a susceptor for mounting a semiconductor wafer and can function as any one of a heater and an electrostatic chuck, and both a heater and an electrostatic chuck.

* * * * *

UNITED STATES PATENT AND TRADEMARK OFFICE
CERTIFICATE OF CORRECTION

| | |
|---|---|
| PATENT NO. | : 7,758,970 B2 |
| APPLICATION NO. | : 12/104547 |
| DATED | : July 20, 2010 |
| INVENTOR(S) | : Masayuki Shinkai, Takahiro Ishikawa and Masahiro Kida |

It is certified that error appears in the above-identified patent and that said Letters Patent is hereby corrected as shown below:

Column 17

*Line 28*: please delete "one of said"

Signed and Sealed this

Nineteenth Day of October, 2010

David J. Kappos
*Director of the United States Patent and Trademark Office*